US008983763B2

(12) United States Patent
Mate et al.

(10) Patent No.: US 8,983,763 B2
(45) Date of Patent: Mar. 17, 2015

(54) METHOD AND APPARATUS FOR DETERMINING A RELATIVE POSITION OF A SENSING LOCATION WITH RESPECT TO A LANDMARK

(75) Inventors: Sujeet Shyamsundar Mate, Tampere (FI); Radu Ciprian Bilcu, Tampere (FI); Igor Danilo Diego Curcio, Tampere (FI); Francesco Cricri, Tampere (FI)

(73) Assignee: Nokia Corporation, Espoo (FI)

( * ) Notice: Subject to any disclaimer, the term of this patent is extended or adjusted under 35 U.S.C. 154(b) by 543 days.

(21) Appl. No.: 12/887,947

(22) Filed: Sep. 22, 2010

(65) Prior Publication Data

US 2012/0072100 A1    Mar. 22, 2012

(51) Int. Cl.
| | |
|---|---|
| G05D 1/02 | (2006.01) |
| G06F 17/10 | (2006.01) |
| G06G 7/78 | (2006.01) |
| H04W 4/02 | (2009.01) |
| H04W 4/04 | (2009.01) |
| G01C 21/20 | (2006.01) |
| G01C 21/32 | (2006.01) |
| G01C 21/00 | (2006.01) |

(52) U.S. Cl.
CPC ............. H04W 4/026 (2013.01); H04W 4/04 (2013.01); G01C 21/206 (2013.01); G01C 21/32 (2013.01); G01C 21/005 (2013.01)
USPC ........... 701/300; 701/516; 701/426; 701/400; 701/408

(58) Field of Classification Search
USPC ......... 701/300, 516, 426, 400, 408; 705/14.4; 707/E17.001, E17.009; 348/143, 348/E7.086; 340/990, 995.1
See application file for complete search history.

(56) References Cited

U.S. PATENT DOCUMENTS

| | | | | |
|---|---|---|---|---|
| 5,276,785 | A | * | 1/1994 | Mackinlay et al. ........... 345/427 |
| 7,457,628 | B2 | * | 11/2008 | Blumberg et al. ......... 455/456.1 |
| 7,496,445 | B2 | * | 2/2009 | Mohsini et al. ............... 701/434 |

(Continued)

FOREIGN PATENT DOCUMENTS

| | | |
|---|---|---|
| JP | 2009 264983 A | 11/2009 |
| WO | WO 2008/018042 A2 | 2/2008 |
| WO | WO 2010/052365 A1 | 5/2010 |

OTHER PUBLICATIONS

International Search Report and Written Opinion for International Application No. PCT/IB2011/053358, mailed Jan. 5, 2012.

(Continued)

*Primary Examiner* — Dalena Tran
*Assistant Examiner* — Jaime Figueroa
(74) *Attorney, Agent, or Firm* — Alston & Bird LLP (57) ABSTRACT

An apparatus may include a landmark selector configured to receive selection of a landmark. A sensory device may determine at least one position indicator relating to alignment with the landmark from a sensing location, such as orientation, attitude, and/or altitude. The apparatus may further include a position determiner configured to determine a relative position of the sensing location with respect to the landmark based at least in part on the position indicator. Accordingly, the apparatus may determine the relative position of the sensing location with respect to the landmark. In some embodiments the apparatus may be further configured to determine the absolute position of the sensing location. Thereby position information may be used, for example, to create collaborative content captured at an event occurring near the landmark.

20 Claims, 9 Drawing Sheets

(56) References Cited

U.S. PATENT DOCUMENTS

| | | | |
|---|---|---|---|
| 7,599,795 B1* | 10/2009 | Blumberg et al. | 701/426 |
| 2003/0014402 A1* | 1/2003 | Sealand et al. | 707/3 |
| 2003/0092450 A1* | 5/2003 | Juppi et al. | 455/456 |
| 2004/0039519 A1* | 2/2004 | Burg et al. | 701/200 |
| 2004/0139049 A1* | 7/2004 | Hancock et al. | 707/1 |
| 2004/0167714 A1* | 8/2004 | Macphail | 701/213 |
| 2006/0007308 A1 | 1/2006 | Ide et al. | |
| 2007/0069923 A1* | 3/2007 | Mendelson | 340/988 |
| 2008/0153516 A1 | 6/2008 | Hsieh | |
| 2008/0162032 A1* | 7/2008 | Wuersch et al. | 701/201 |
| 2008/0269644 A1 | 10/2008 | Ray | |
| 2009/0319178 A1* | 12/2009 | Khosravy et al. | 701/207 |
| 2009/0327954 A1* | 12/2009 | Danton et al. | 715/810 |
| 2010/0023388 A1 | 1/2010 | Blumberg et al. | |
| 2010/0097483 A1 | 4/2010 | Icho et al. | |
| 2010/0289695 A1* | 11/2010 | Kirmuss et al. | 342/357.47 |

OTHER PUBLICATIONS

Extended European Search Report from corresponding European Patent Application No. 11 82 6483, dated Jul. 15, 2014.

International Preliminary Report on Patentability for Application No. PCT/IB2011/053358 dated Mar. 26, 2013.

Theodolite [online] [retrieved Aug. 14, 2014]. Retrieved from the Internet: <URL: http://hunter.pairsite.com/mobile/theodolite/help/index.html>. (dated Apr. 24, 2012) 6 pages.

* cited by examiner

METHOD AND APPARATUS FOR DETERMINING A RELATIVE POSITION OF A SENSING LOCATION WITH RESPECT TO A LANDMARK

TECHNOLOGICAL FIELD

An example embodiment of the present invention relates generally to determining a relative position of a sensing location with respect to a landmark and, more particularly, relates to an apparatus, a method and a computer program product configured to receive selection of a landmark, determine a position indicator relating to alignment with a landmark from a sensing location, and determine a relative position of the sensing location with respect to the landmark based at least in part on the position indicator.

BACKGROUND

In order to provide easier or faster information transfer and convenience, telecommunication industry service providers are continually developing improvements to existing communication networks. As a result, wireless communication has become increasingly more reliable in recent years. Along with the expansion and improvement of wireless communication networks, user terminals used for wireless communication have also been continually improving. In this regard, due at least in part to reductions in size and cost, along with improvements in battery life and computing capacity, user terminals have become more capable, easier to use, and cheaper to obtain. Further, many user terminals now include a variety of sensory devices and memory which enables the user terminals to capture and record sensory information and content such as audio and video.

Due to the now ubiquitous nature of user terminals, people of all ages and education levels are utilizing user terminals to communicate with other individuals or user contacts, receive services and/or share information, media and other content. For example, at any given event such as a concert or festival, a plurality of users may be present with respective user terminals capable of recording and sharing content relating to the event. Thereby, users at locations remote from the event may be able to receive content relating to the event. However, it may be difficult to combine the content provided by the various user terminals into collaborative content which takes advantage of the unique perspectives of the event offered by the differing locations of the user terminals without knowing location information relating to the positions of the user terminals. Further, location information may be difficult to obtain in certain situations, for example when the event occurs indoors or when the user terminals are not equipped with global positioning systems (GPS).

BRIEF SUMMARY

A method, apparatus and computer program product are therefore provided to determine a relative position of a sensing location at which a user terminal is positioned.

In an example embodiment, an apparatus comprises at least one processor and at least one memory including computer program code, the at least one memory and the computer program code configured to, with the processor, cause the apparatus to receive selection of a landmark, determine at least one position indicator relating to alignment with the landmark from a sensing location, and determine a relative position of the sensing location with respect to the landmark based at least in part on the position indicator.

In an additional example embodiment a method comprises receiving selection of a landmark, determining at least one position indicator relating to alignment with the landmark from a sensing location, and determining a relative position of the sensing location with respect to the landmark via a processor based at least in part on the position indicator.

In a further example embodiment a computer program product comprises at least one computer-readable storage medium having computer-executable program code portions stored therein, the computer-executable program code portions comprising program code instructions for receiving selection of a landmark, program code instructions for determining at least one position indicator relating to alignment with the landmark from a sensing location, and program code instructions for determining a relative position of the sensing location with respect to the landmark based at least in part on the position indicator.

In a further example embodiment an apparatus comprises means for selecting a landmark, means for sensing, and means for determining a relative position. Means for selecting a landmark may comprise a landmark selector, a user interface and/or a processor, which may be configured to receive selection of a landmark. Means for sensing may comprise a sensory device, the user interface, and/or the processor, which may be configured to determine at least one position indicator relating to alignment with the landmark from a sensing location. Further, means for determining a relative position may comprise a position determiner, and/or the processor, which may be configured to determine a relative position of the sensing location with respect to the landmark based at least in part on the position indicator.

In some embodiments the apparatuses described above may be further configured to suggest the landmark. The apparatuses may also be configured to signal the position indicator and signal the relative position of the sensing location. Further, the apparatuses may be configured to determine one or more other relative positions of one or more other sensing locations and signal the one or more other relative positions of the one or more other sensing locations. Additionally, the position indicator may comprise one or more of an orientation when aligned with the landmark, an attitude when aligned with the landmark, and an altitude at the sensing location. Also, the apparatuses may be configured to determine an absolute position of the sensing location. The apparatuses may further comprise user interface circuitry configured to facilitate user control of at least some functions of the apparatus through use of a display, and cause at least a portion of a user interface of the apparatus to be displayed on the display to facilitate user control of at least some functions of the apparatus. The apparatuses may additionally be configured to provide for acknowledgement of alignment with the landmark. Similar embodiments of the method and computer program product are also provided. Accordingly, embodiments of the present invention may provide a way to determine the relative position of a user terminal with respect to a visible landmark, even when GPS is not available.

BRIEF DESCRIPTION OF THE SEVERAL VIEWS OF THE DRAWING(S)

Having thus described embodiments of the present disclosure in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term 'circuitry' refers to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Figure 1:
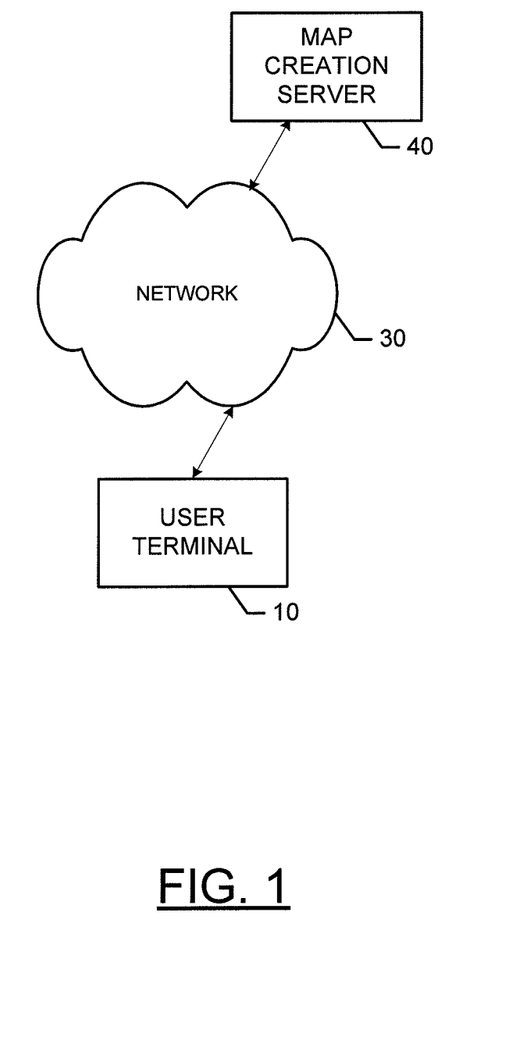
FIG. 1 illustrates a schematic block diagram of a system according to an example embodiment of the present invention.

As indicated above, some embodiments of the present invention may be employed in methods, apparatuses and computer program products configured to determine a relative position of a sensing location with respect to a landmark. In this regard, for example, FIG. 1 illustrates a block diagram of a system that may benefit from embodiments of the present invention. It should be understood, however, that the system as illustrated and hereinafter described is merely illustrative of one system that may benefit from an example embodiment of the present invention and, therefore, should not be taken to limit the scope of embodiments of the present invention.

As shown in FIG. 1, a system in accordance with an example embodiment of the present invention may include a user terminal 10. The user terminal 10 may be any of multiple types of fixed or mobile communication and/or computing devices such as, for example, personal digital assistants (PDAs), pagers, mobile televisions, mobile telephones, gaming devices, laptop computers, personal computers (PCs), cameras, camera phones, video recorders, audio/video players, radios, global positioning system (GPS) devices, or any combination of the aforementioned, which employ an embodiment of the present invention.

In some embodiments the user terminal 10 may be capable of communicating with other devices, either directly, or via a network 30. The network 30 may include a collection of various different nodes, devices or functions that may be in communication with each other via corresponding wired and/or wireless interfaces. As such, the illustration of FIG. 1 should be understood to be an example of a broad view of certain elements of the system and not an all inclusive or detailed view of the system or the network 30. Although not necessary, in some embodiments, the network 30 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), and/or the like. Thus, the network 30 may be a cellular network, a mobile network and/or a data network, such as a local area network (LAN), a metropolitan area network (MAN), and/or a wide area network (WAN), for example, the Internet. In turn, other devices such as processing elements (for example, personal computers, server computers or the like) may be included in or coupled to the network 30. By directly or indirectly connecting the user terminal 10 and the other devices to the network 30, the user terminal and/or the other devices may be enabled to communicate with each other, for example, according to numerous communication protocols including Hypertext Transfer Protocol (HTTP) and/or the like, to thereby carry out various communication or other functions of the user terminal and the other devices, respectively. As such, the user terminal 10 and the other devices may be enabled to communicate with the network 30 and/or each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as wireless LAN (WLAN), Worldwide Interoperability for Microwave Access (WiMAX), WiFi, ultra-wide band (UWB), Wibree techniques and/or the like and fixed access mechanisms such as digital subscriber line (DSL), cable modems, Ethernet and/or the like. Thus, for example, the network 30 may be a home network or other network providing local connectivity.

The system may additionally comprise a map creation server 40. In some embodiments the map creation server 40 may be embodied as a server, server bank or other computer or other computing device or node configured to map relative positions of sensing locations with respect to landmarks, as will be explained below. The map creation server 40 may have any number of functions or associations with various services. As such, for example, the map creation server 40 may be a platform such as a dedicated server (or server bank), or the map creation server may be a backend server associated with one or more other functions or services. Thus, the map creation server 40 may map the relative position of the user terminal 10, for example, with respect to a landmark.

However, in other embodiments the user terminal 10 may collaborate directly with other user terminals to map relative positions of the user terminals with respect to landmarks. For example, user terminals may communicate with one another via a peer-to-peer network in some embodiments, and one or more of the user terminals may determine the relative positions thereof, rather than by using the map creation server 40 to determine their relative positions. In some such embodiments the peer-to-peer network may comprise an ad-hoc peer-to-peer network using localized radio access. Thus, although the map creation server 40 is herein generally described as a server, in some embodiments the map creation server may be embodied as a portion of the user terminal 10, such an internal module therein, or embodied on the network 30.

Further, signaling of position indicators and relative positions between the user terminals and/or the map creation server 40 may use any suitable transport mechanism such as, for example, extensible markup language (XML) over hypertext transfer protocol (HTTP) transport, session description protocol (SDP) over session initiation protocol (SIP), and/or via short message service (SMS). For example, the user terminal 10 may be configured to signal a position indicator to the map creation server 40, and then the map creation server may determine and signal a relative position of the sensing location based at least in part on the sensing location. Further, in some embodiments the map creation server 40 may receive position indicators signaled from one or more other user terminals, determine the other relative positions of the other user terminals at one or more other sensing locations, and signal the other relative positions of the other user terminals to the user terminal 10. Accordingly, the user terminal 10 may be provided with data (e.g. in the form of a map in some embodiments) indicating the relative position of the user terminal itself, as well as the relative positions of other user terminals. Signaling may occur over any of a variety of different transport protocols, as described above, and may involve one or both of sending and receiving data.

In an example embodiment, an apparatus 50 is provided that may be employed by devices performing example embodiments of the present invention. The apparatus 50 may be embodied, for example, as any device hosting, including, controlling or otherwise comprising the user terminal 10 and/or the map creation server 40. However, embodiments may also be embodied on a plurality of other devices such as for example where instances of the apparatus 50 may be embodied on the network 30. As such, the apparatus 50 of FIG. 2 is merely an example and may include more, or in some cases less, than the components shown in FIGS. 2.

Figure 2:
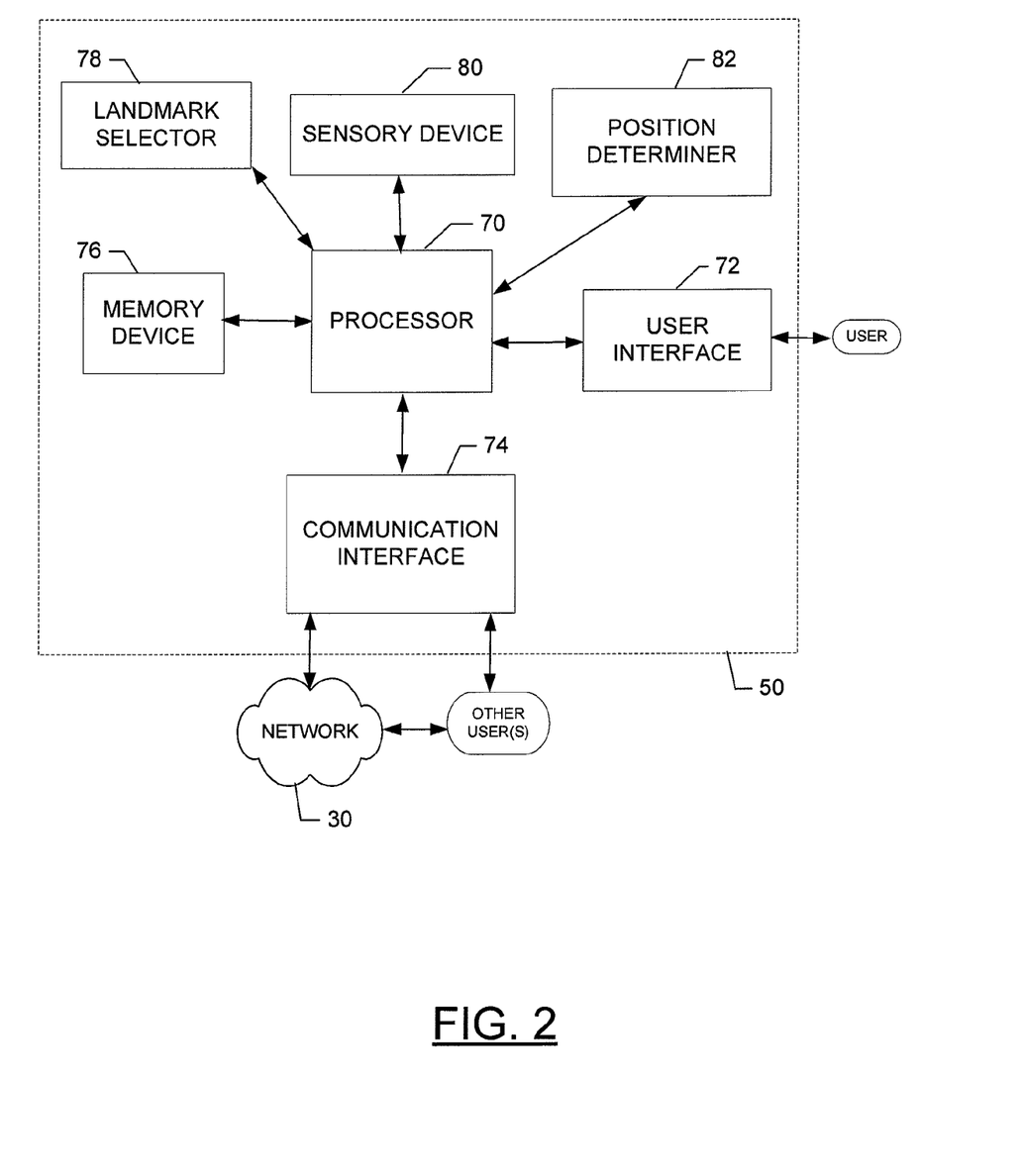
FIG. 2 illustrates a schematic block diagram of an apparatus configured determine a relative position of a sensing location with respect to a landmark according to an example embodiment of the invention.

With further regard to FIG. 2, the apparatus 50 may be configured to determine a relative position of a sensing location with respect to a landmark. The apparatus 50 may include or otherwise be in communication with a processor 70, a user interface 72, a communication interface 74 and a memory device 76. The memory device 76 may include, for example, volatile and/or non-volatile memory. The memory device 76 may be configured to store information, data, files, applications, instructions or the like. For example, the memory device 76 could be configured to buffer input data for processing by the processor 70. Additionally or alternatively, the memory device 76 could be configured to store instructions for execution by the processor 70.

As mentioned above, the apparatus 50 may, in some embodiments, be a user terminal or a fixed communication device or computing device configured to employ an example embodiment of the present invention. However, in some embodiments, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 70 may be embodied in a number of different ways. For example, the processor 70 may be embodied as one or more of various processing means such as a coprocessor, a microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a hardware accelerator, a special-purpose computer chip, or other hardware processor. In an example embodiment, the processor 70 may be configured to execute instructions stored in the memory device 76 or otherwise accessible to the processor. Alternatively or additionally, the processor 70 may be configured to execute hard coded functionality. As such, whether configured by hardware or software methods, or by a combination thereof, the processor 70 may represent an entity (for example, physically embodied in circuitry) capable of performing operations according to embodiments of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor to perform the algorithms and/or operations described herein when the instructions are executed. However, in some cases, the processor 70 may be a processor of a specific device (for example, a user terminal or network device such as a server) adapted for employing embodiments of the present invention by further configuration of the processor by instructions for performing the algorithms and/or operations described herein. The processor 70 may include, among other things, a clock, an arithmetic logic unit (ALU) and logic gates configured to support operation of the processor.

Meanwhile, the communication interface 74 may be any means such as a device or circuitry embodied in either hardware, software, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (for example, network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet, High-Definition Multimedia Interface (HDMI) or other mechanisms. Furthermore, the communication interface 74 may include hardware and/or software for supporting communication mechanisms such as BLUETOOTH®, Infrared, UWB, WiFi, and/or the like, which are being increasingly employed in connection with providing home connectivity solutions.

The user interface 72 may be in communication with the processor 70 to receive an indication of a user input at the user interface and/or to provide an audible, visual, mechanical or other output to the user. As such, the user interface 72 may include, for example, a keyboard, a mouse, a joystick, a display, a touch screen, a microphone, a speaker, or other input/output mechanisms.

The processor 70 may comprise user interface circuitry configured to control at least some functions of one or more elements of the user interface 72, such as, for example, the speaker, the ringer, the microphone, the display, and/or the like. The processor 70 and/or user interface circuitry comprising the processor 70 may be configured to control one or more functions of one or more elements of the user interface 72 through computer program instructions (for example, software and/or firmware) stored on a memory accessible to the processor 70 (for example, memory device 76, and/or the like).

In some embodiments the apparatus 50 may further include a landmark selector 78. The processor 70 or other circuitry may be embodied as, include or otherwise control the landmark selector 78. The landmark selector 78 may be configured to receive selection of a landmark. A landmark, as used herein, may refer to any object which is identifiable, for example, by sight. In this regard, as will be explained below, a plurality of apparatuses may align with the landmark so as to determine the relative positions of the apparatuses.

Selection of a landmark may in various embodiments take different forms. In this regard, for example, the user of the apparatus 50 may be provided with a map by the landmark selector 78 from which the user may select a landmark. In some embodiments the landmark selector 78 may comprise a database of landmarks which may be stored in the apparatus 50 or otherwise accessible thereto, for example, through the communication interface 74 when the database is stored by the map creation server 40.

Thus, in some embodiments the landmark selector 78 may provide the user with a variety of known landmarks from which to make a selection. A graphical map may be provided to the user to make the selection in some embodiments, whereas in other embodiments the known landmarks may be provided as a list of available choices, or in other formats. The apparatus 50 may be useful for determining relative positions of the apparatus and other apparatuses with respect to the landmark in instances in which determination of the absolute positions of the apparatuses may be relatively difficult or impossible using means such as GPS. Accordingly, in some instances the known landmarks which are provided to the user for selection may be selected by the landmark selector 78 based on the cellular identification of the network on which the apparatus 50 is operating. However, the landmark selector 78 may employ various other techniques in selecting the known landmarks, for example, by suggesting the known landmarks based on a most recent GPS reading conducted by the apparatus 50 or by a user input which provides the apparatus with a city or other description of the location.

In some instances the landmark selector 78 may not be configured to provide the user with known landmarks from which to select, or the landmark selector may not have access to information relating to landmarks in the particular area in which the apparatus 50 is located. Thereby the landmark selector 78 may be configured to receive selection of a landmark which is not in a database of known landmarks. For example, the landmark selector 78 may instruct the user to travel to the desired landmark and capture sensory data at that location along with a specific target on the landmark for alignment, and/or the user may describe the landmark such that the landmark selector may then include information relating to the new landmark.

In some embodiments the landmark selector 78 may select which user terminal 10 selects the landmark. For example, when the apparatus 50 is embodied on the map creation server 40, the apparatus may randomly select a user terminal and direct the user of the selected user terminal to select the landmark. In other embodiments, for example when the apparatus 50 is embodied on the user terminals 10, the landmark selector 78 may direct the user to select a landmark if no other user terminal has yet selected a landmark near the user's location at that particular time.

In some embodiments the apparatus 50 may further include a sensory device 80. The processor 70 or other circuitry may be embodied as, include or otherwise control the sensory device 80. The sensory device 80 may be configured to provide for capture of a position indicator relating to alignment with the landmark from a sensing location. The sensing location is thus the location at which the apparatus 50 is positioned in embodiments in which the apparatus is embodied as the user terminal 10. In this regard, once a landmark has been selected, the apparatus 50 may then capture information relating to sensing location of the apparatus.

Position indicators may comprise one or more of an orientation of the apparatus 50 when aligned with the landmark, an attitude when aligned with the landmark, and an altitude of the apparatus in some embodiments. Thus, by way of example, orientation may be determined by a compass which determines the direction on a horizontal plane in which apparatus 50 is facing. Further, an accelerometer or gyroscope may determine attitude in the form of an angle on a vertical plane at which the apparatus 50 is facing. Additionally, altitude may be determined by an altimeter which senses barometric pressure. Accordingly, the position indicator may include one or more pieces of information which relate to alignment with the landmark from a sensing location. Position indicators may be determined by direct determination with sensors such as with the sensory device 80. However, position indicators may also be determined by indirect determination in the form of receiving and recognizing the position indicator from another component or by receiving some raw position info from another component which is then processed to define the position indicator in various example embodiments.

Figure 3:
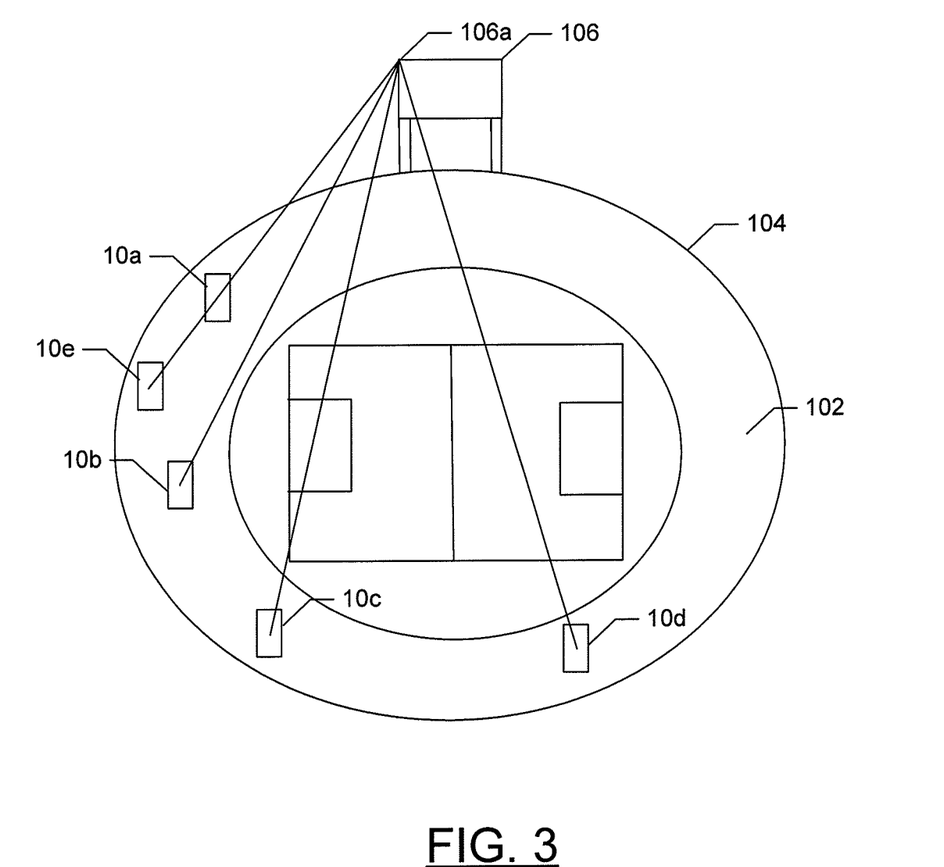
FIG. 3 illustrates a sporting arena at which a landmark is visible to the users of a plurality of user terminals according to an example embodiment of the present invention.

FIG. 3 illustrates an example embodiment of aligning a plurality of user terminals 10*a-e*. The user terminals 10*a-e* are illustrated as being positioned at various sensing locations within a seating section 102 at a sporting arena 104. The sporting arena 104 may comprise a dome or other partially or fully enclosed space in which determining position of the user terminals 10*a-e* using GPS receivers may be difficult or impossible. The user terminals 10a-e are thus illustrated as being aligned with a landmark in the form of a scoreboard 106 for purposes of determining the relative positions thereof. In particular, the user terminals 10a-e are illustrated as being aligned with the upper left corner 106a of the scoreboard 106. In this regard, the landmark selector 78 may in some embodiments suggest a target on the landmark at which to align from the sensing locations. Thereby, in some embodiments the target selector 78 may automatically select the landmark and/or the target thereon, whereas in other embodiments one of the users of the user terminals 10a-e may select the landmark and/or the target. Landmarks and targets may be selected in some embodiments so as to be visible to the greatest number of user terminals at the event as possible. For example, a high object which is visible from a variety of angles, such as the scoreboard 106, may serve as a suitable landmark.

Figure 4:
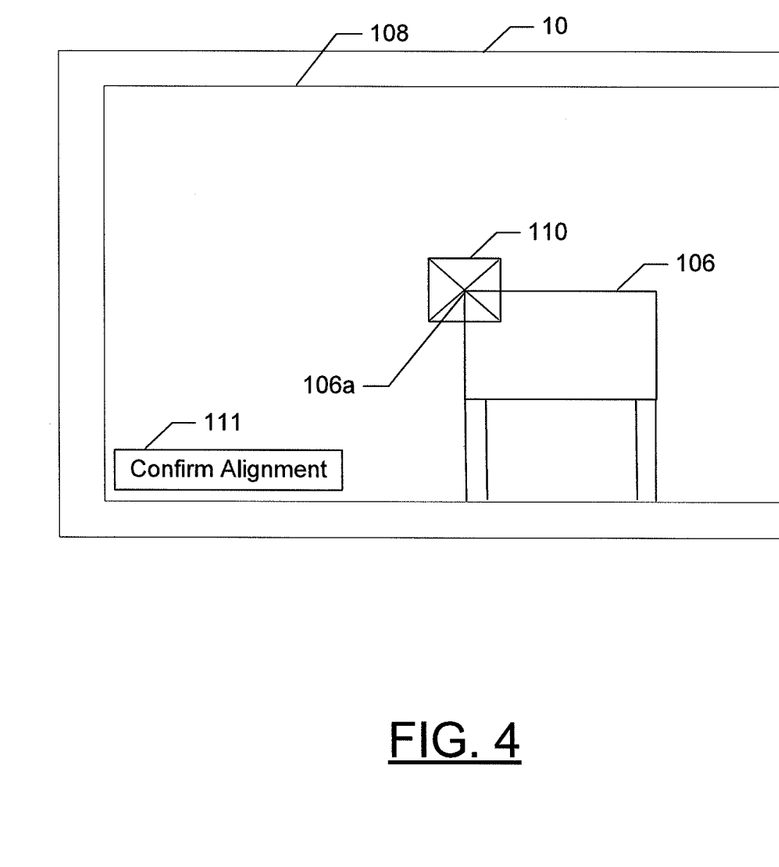
FIG. 4 illustrates a user terminal employing the apparatus of FIG. 2 to align with the landmark from FIG. 3 according to an example embodiment of the present invention.

Once the landmark and target are selected, the user terminals 10a-e may each align with the target on the landmark so as to capture position indicators using the sensory device 80 as described above. In this regard FIG. 4 illustrates a user terminal 10 aligning with the target on the landmark. As illustrated, a user may align the user terminal 10 with the target using a screen 108 which may comprise a portion of the user interface 72 of the apparatus 50. However, in other embodiments a viewfinder or other device suitable to align the user terminal 10 with respect to the target may be employed. In order to accurately align the user terminal 10 with the target on the landmark, the user of the user terminal 10 may align a cross-hair 110 with the target. Thus, as illustrated, the cross-hair 110 is shown aligned with the upper left corner 106a of the scoreboard 106. Once the user terminal 10 is aligned with the target on the landmark, the user may trigger the sensing of one or more position indicators by confirming alignment with the target on the landmark. For example, in the illustrated embodiment the user may select a confirm alignment button 111 when the user terminal 10 is aligned with the target on the landmark to thereby trigger sensing of the position indicators.

Returning to FIG. 2, in some embodiments the apparatus 50 may further include a position determiner 82. The processor 70 or other circuitry may be embodied as, include or otherwise control the position determiner 82. The position determiner 82 may be configured to determine a relative position of the sensing location with respect to the landmark based at least in part on the position indicator.

Thus, the position indicators may provide various pieces of information which may be used to determine the relative position of the sensing location with respect to the landmark. In this regard, the position determiner 82 may employ trigonometry and other mathematical equations to determine the relative position of the sensing location of the apparatus 50 with respect to the landmark. For example, FIG. 5 illustrates a schematic representation of first 10a and second 10b user terminals as they are positioned with respect to the target (e.g. the upper left corner 106a) on the landmark (e.g. the scoreboard 106).

Figure 5:
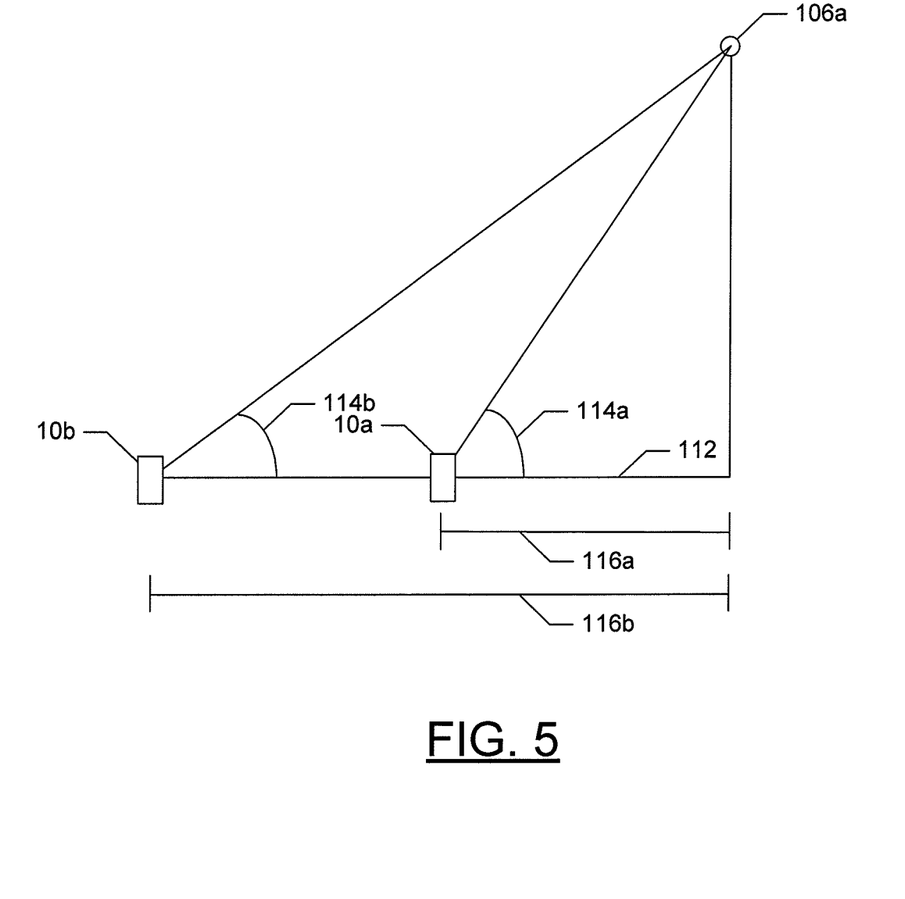
FIG. 5 illustrates calculating relative positions of user terminals at the same altitude using the apparatus of FIG. 2 according to an example embodiment of the present invention.

In particular, FIG. 5 illustrates use of the position indicator relating to altitude and attitude to determine the horizontal displacement of the user terminals 10 from the target (e.g. the upper left corner 106a). In the illustrated embodiment, both the first user terminal 10a and the second user terminal 10b are positioned at the same altitude 112. For example, the first user terminal 10a and the second user terminal 10b may be located at approximately the same row and level within the seating section 102 at the sporting arena 104. However, the attitude 114a of the first user terminal 10a is greater than the attitude 114b of the second user terminal 10b. Accordingly, the position determiner 82 may determine that the relative position of the first user terminal 10a is at a horizontal displacement 116a which is less than the horizontal displacement 116b of the second user terminal 10b from the target (e.g. the upper left corner 106a) on the landmark (e.g. the scoreboard 106).

Figure 6:
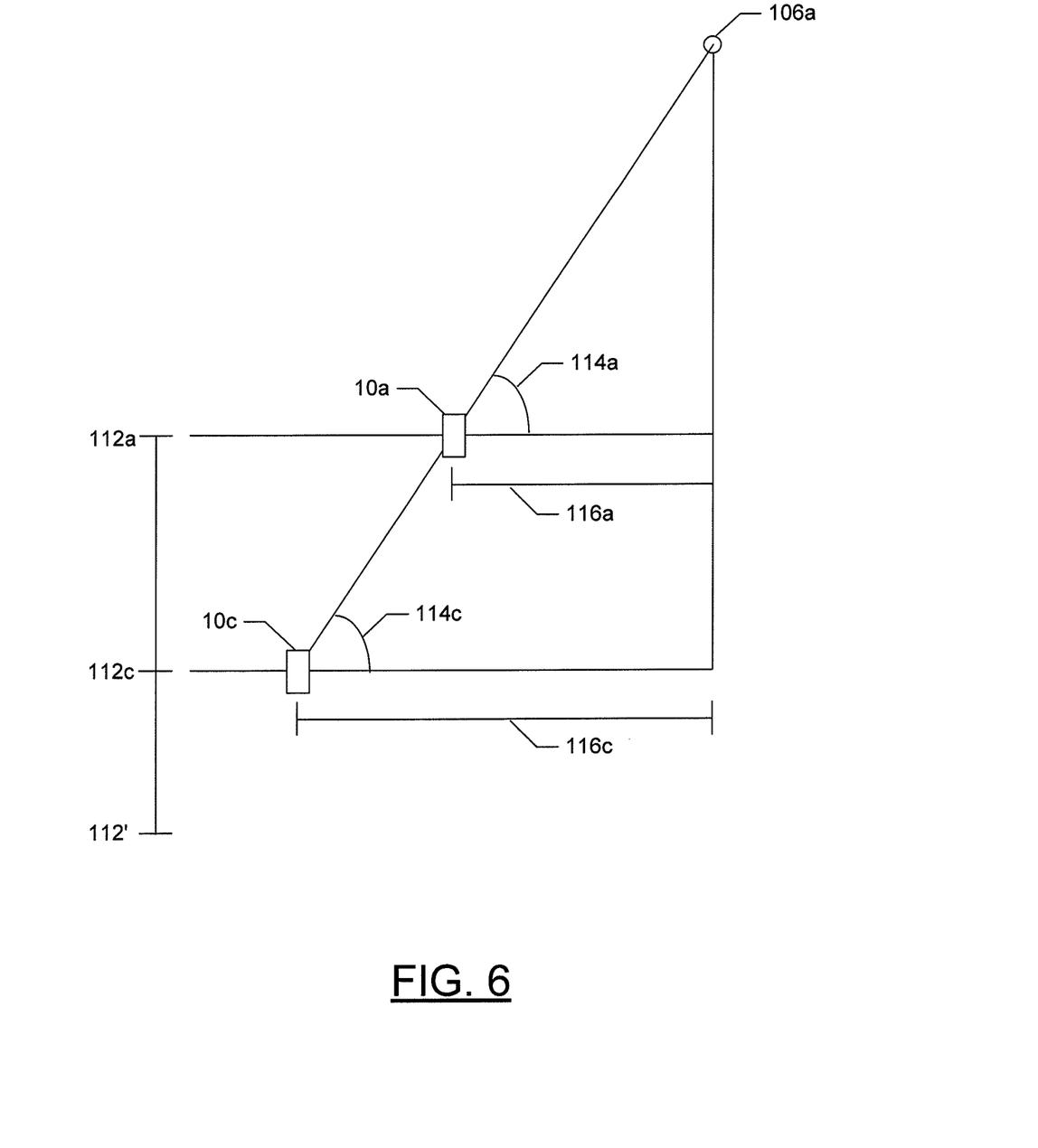
FIG. 6 illustrates calculating relative positions of user terminals at different altitudes using the apparatus of FIG. 2 according to an example embodiment of the present invention.

By way of further example, FIG. 6 illustrates an embodiment in which the attitudes 114a, 114c of the user terminals 10a, 10c are the same, but the altitudes 112a, 112c differ. In this regard, the first user terminal 10a may be at an altitude 112a with respect to sea level 112' which is relatively higher than an altitude 112c of the third user terminal 10c. For example, the third user terminal 10c may be positioned at a sensing location which is in a lower row or section than the first user terminal 10a. Note that while altitude is generally discussed herein in terms of an absolute measurement with respect to sea level 112', position indicators may also comprise relative altitudes in some embodiments. For example, calculation of altitude may be affected by changes in barometric pressure due to weather changes, but the relative altitudes would still be useable for determining relative positions of the sensing locations with respect to the landmark. Returning to the calculation of relative positions, despite both the first user terminal 10a and the third user terminal 10c aligning with the target (e.g. the upper left corner 106a) of the landmark (e.g. the scoreboard 106), at the same attitude 114a, 114c, the relative positions may be determined to differ at least in that the horizontal displacement 116a of the first user terminal is less than the horizontal displacement 116c of the second user terminal with respect to the landmark.

Figure 7:
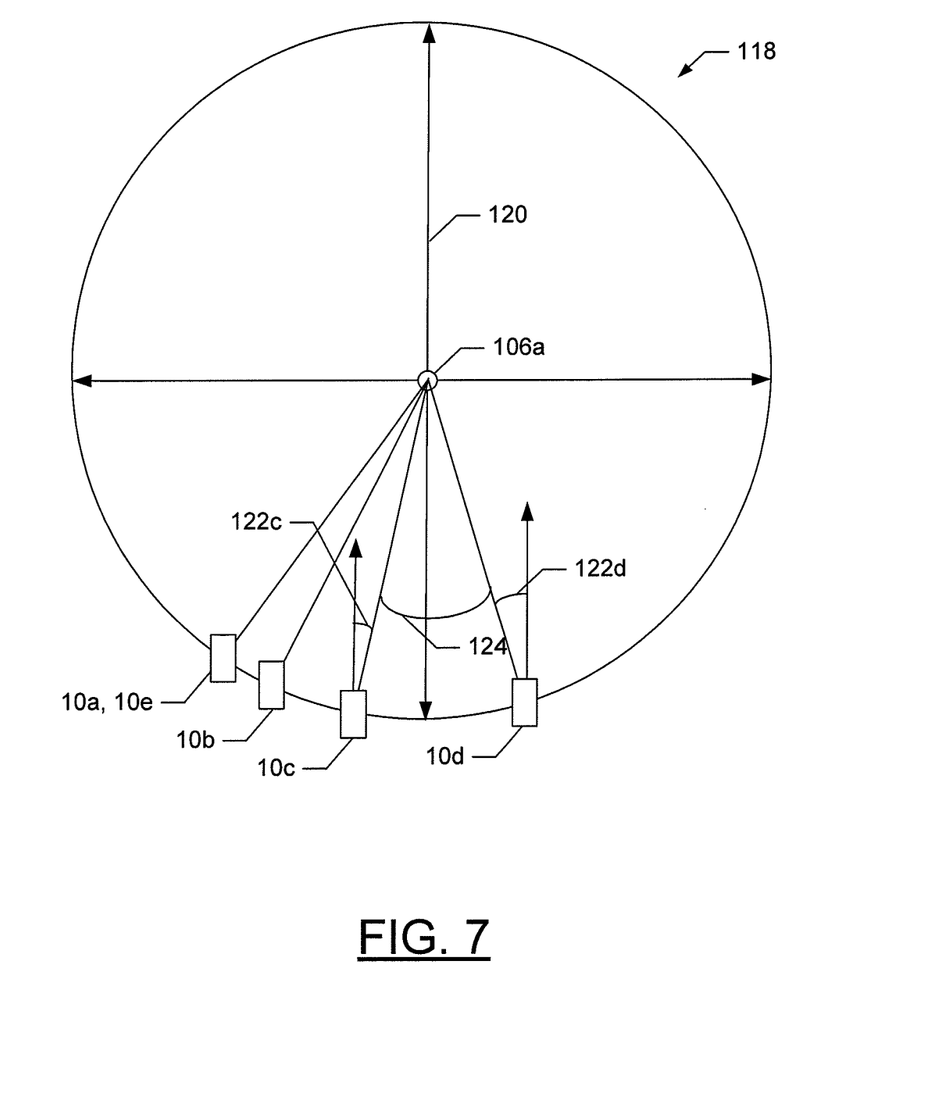
FIG. 7 illustrates calculating relative positions of user terminals using orientation with the apparatus of FIG. 2 according to an example embodiment of the present invention.

With regard to other position indicators which may be sensed, FIG. 7 illustrates a map 118 of the angular positions of the user terminals 10a-e relative to the target (e.g. the upper left corner 106a) on the landmark (e.g. the scoreboard 106). In the illustrated embodiment the map 118 is oriented with respect to a north direction 120, although the map may be oriented with respect to other directions in various embodiments. The map 118 may be created based on a detected orientation for each of the user terminals 10a-e when the user terminals are aligned with the landmark. For example, the orientation values may be detected by internal compasses in each of the user terminals 10a-e which detect an orientation angle with respect to the north direction 120. In this regard, FIG. 7 illustrates the orientation angles 122c, 122d for the third 10c and fourth 10d user terminals. Using this information, the position determiner 82 may determine an angular separation 124 between the third user terminal 10c and the fourth 10d user terminals. Similar calculations may be conducted by the position determiner for the other user terminals 10 to determine the angular separations therebetween. Accordingly, the position determiner 82 may map out the respective angular separations between the user terminals 10.

Figure 8:
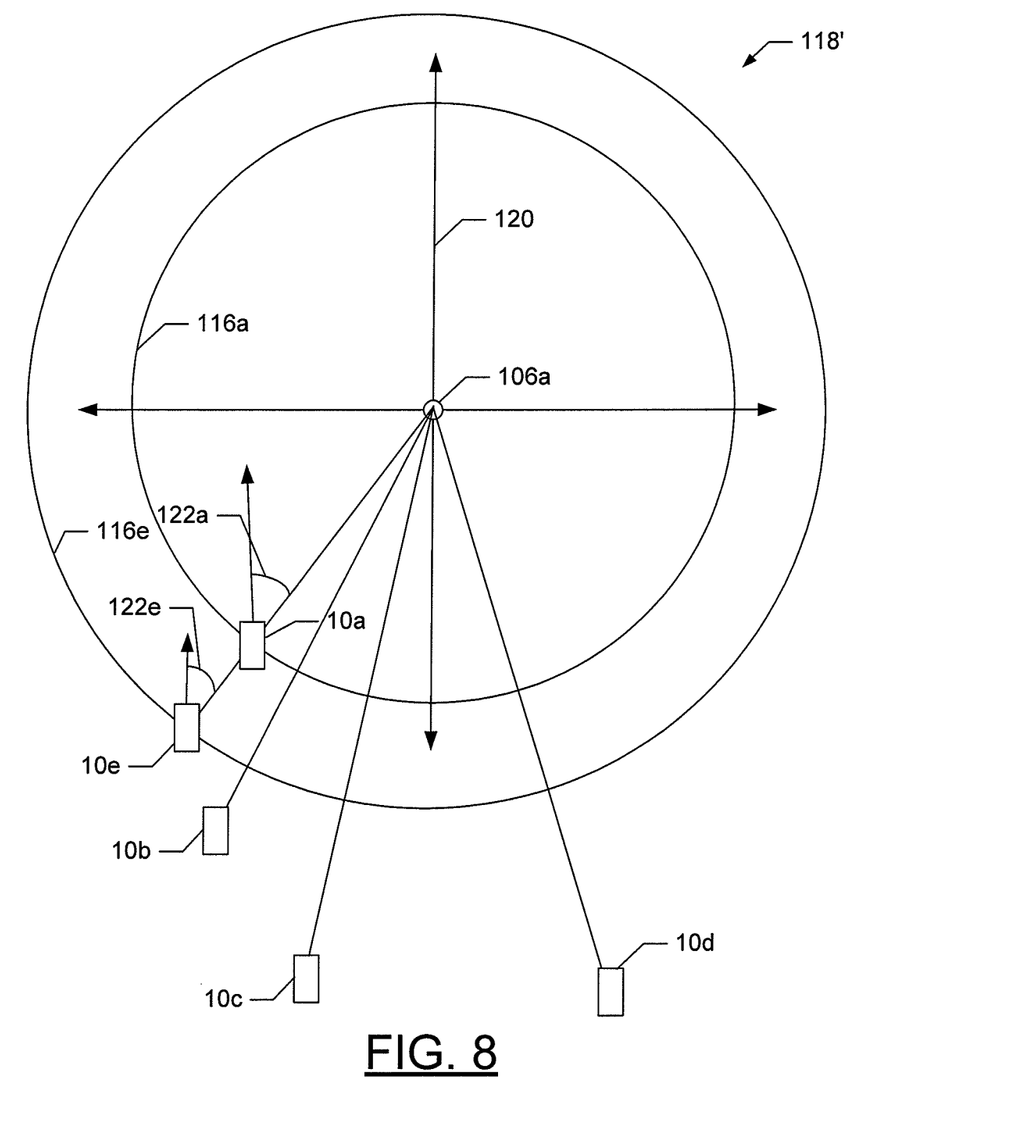
FIG. 8 illustrates calculating relative positions of user terminals using orientation, attitude, and altitude with the apparatus of FIG. 2 according to an example embodiment of the present invention.

Thus, as illustrated in FIGS. 5 and 6, the relative positions of the sensing locations at which the user terminals 10 are positioned may be determined in terms of a horizontal displacement from the landmark. Further, as illustrated in FIG. 7, the relative positions of the sensing locations at which the user terminals 10 are positioned may be determined in terms of orientation when aligned with the landmark as well as angular separations between the user terminals. As illustrated in FIG. 8, this information may be combined by the position determiner 82 in some embodiments to form a map 118' which includes additional position information than the map 118 illustrated in FIG. 7. In this regard, both the orientation and horizontal displacement of the user terminals 10a-e are illustrated in FIG. 8. The orientation is illustrated in the same manner as described above with respect to FIG. 7, and hence discussion of orientation and angular separation will not be repeated. However, now horizontal displacement is illustrated as having been calculated, for example, using the methods described above with respect to FIGS. 5 and 6.

In this regard, calculation of the relative positions using attitude, altitude, and orientation may provide more information with regard to the relative positions of the user terminals 10*a-e* than would be provided by using just orientation information. For example, FIG. 7 illustrates only that information which may be obtained based on an orientation position indicator. As illustrated, the first user terminal 10*a* and the fifth user terminal 10*e* share the same orientation angle with respect to the landmark (e.g. the upper left corner 106*a* target on the scoreboard 106), and thus the relative position of the first and fifth user terminal appears to be the same using only this information.

However, by calculating the horizontal displacement of the user terminals 10, further information relating to the relative positions of the user terminals may be determined. For example, as illustrated in FIG. 8, although the first 10*a* and fifth 10*e* user terminals share the same orientation angle 122*a*, 122*e*, the horizontal displacement of the fifth user terminal (as indicated by the outer radius 116*e*) is greater than the horizontal displacement of the first user terminal 10*a* (as indicated by the inner radius 116*a*) with respect to the landmark (e.g. the upper left corner 106*a* target on the scoreboard 106). Accordingly, the position determiner 82 may determine the relative positions in greater detail by using each of attitude, altitude, and orientation position indicators.

Further, in some embodiments the position determiner 82 may calculate not only the relative positions of the sensing locations at which the user terminals are located, but also the absolute positions (e.g. the actual longitude and latitude coordinates of the sensing locations). For example, when the landmark is a known landmark with known position information, the absolute positions of the sensing locations may be determined by combining the known position information of the landmark with the relative positions of the user terminals as would be understood by one having skill in the art. Accordingly, the absolute positions of the user terminals 10 may be determined in some embodiments.

The relative position and/or absolute position of each sensing location at which the user terminals 10 are located may be used for a variety of purposes. For example, this information may be used when capturing photos, audio, video, or other content relating to an event near the landmark. By way of example, when an event is occurring near the landmark and there are two or more user terminals present which are capturing content, the relative and/or absolute positions of the of user terminals may be used to determine which captured content to use in forming a compilation of content (e.g. a "director's cut") relating to the event at the location. Thus, content from mobile devices with desired orientations, attitudes, and horizontal displacements may be combined in an optimized and smoothly transitioned fashion, rather than switching between the various content sources without knowing the positions of the user terminals capturing the content. Further in other embodiments the relative positions of the user terminals 10 may be provided to each of the user terminals such that the user terminals may see the locations of the other user terminals around them. However, determining the relative and/or absolute positions of the sensing locations at which the user terminals 10 are positioned may be employed for a variety of other purposes, such as search and rescue by allowing searchers to determine the location of a lost person with a user terminal which is able to view a landmark.

Figure 9:
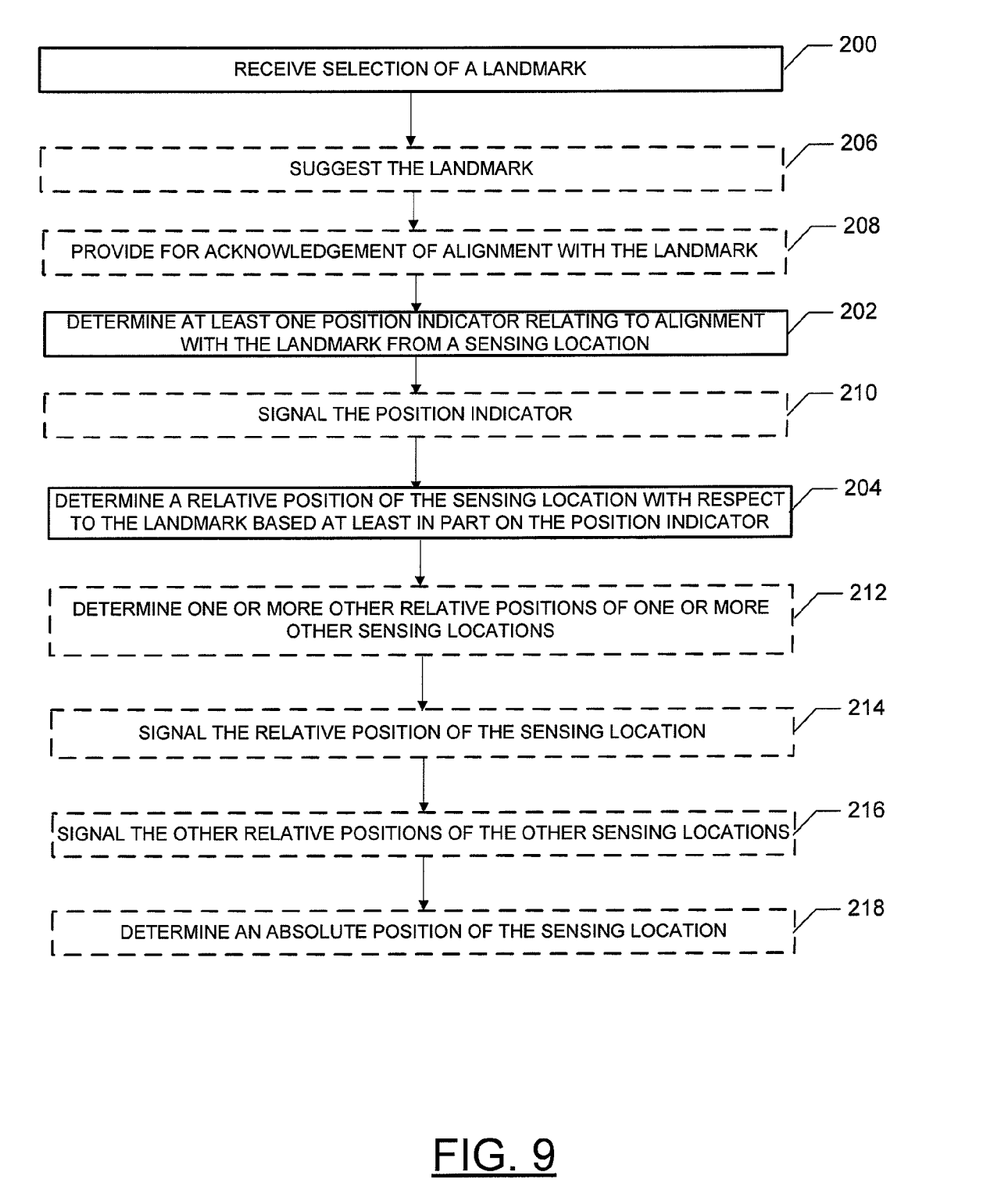
FIG. 9 illustrates a flowchart of the operations performed in determining a relative position of a sensing location with respect to a landmark according to an example embodiment of the present invention.

In terms of methods associated with embodiments of the present invention, the above-described apparatus 50 or other embodiments of apparatuses may be employed. In this regard, FIG. 9 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by a computer program product including computer program instructions. In this regard, the computer program instructions which embody the procedures described above may be stored by a memory device and executed by a processor of an apparatus. As will be appreciated, any such computer program instructions may be loaded onto a computer or other programmable apparatus (for example, hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In this regard, one embodiment of a method includes receiving selection of a landmark at operation 200. Further, the method may include determining at least one position indicator relating to alignment with the landmark from a sensing location at operation 202. The position indicator may comprise one or more of an orientation when aligned with the landmark, an attitude when aligned with the landmark, and an altitude at the sensing location in some embodiments. Additionally, the method may include determining a relative position of the sensing location with respect to the landmark based at least in part on the position indicator at operation 204.

In some embodiments, certain ones of the above-described operations (as illustrated in solid lines in FIG. 9) may be modified or further amplified. In some embodiments additional operations may also be included (some examples of which are shown in dashed lines in FIG. 9). It should be appreciated that each of the modifications, optional additions or amplifications may be included with the above-described operations (200-204) either alone or in combination with any others among the features described herein. As such, each of the other operations as will be described herein may be combinable with the above-described operations (200-204) either alone or with one, more than one, or all of the additional operations in any combination.

For example, the method may further comprise suggesting the landmark at operation 206. For example, a user may be provided with known landmarks in the form of a list or on a map from which to select. The method may additionally include suggesting the landmark based on a cellular identification. Thereby, for example, the cellular identification of the network on which the user terminal is operating may be determined and hence known landmarks which are in the vicinity of the user may be provided.

The method may also comprise suggesting a target on the landmark at which to align from the sensing location. Thereby, for example, multiple user terminals may align with the same portion of the landmark so as to produce more accurate position information. The method may further include providing for acknowledgement of alignment with the landmark at operation 208. Thereby sensing of the position indicator at operation 202 may occur when the device is aligned with the landmark.

In some embodiments the method may additionally include signaling the position indicator at operation 210. Signaling the position indicator at operation 210 may comprise, in one embodiment, the user terminal 10 transmitting the position indicator (e.g. the orientation, attitude, altitude, and/or etcetera) to the map creation server 40. Conversely, signaling the position indicator at operation 210 may comprise, in one embodiment, the map creation server 40 receiving the position indicator. Thus, signaling, as used herein, may refer to one or both of sending or receiving data. Thereby, in one example embodiment the map creation server 40 may receive the position indicator and determine the relative position at operation 204. In some embodiments the method may further comprise determining one or more other relative positions of one or more other sensing locations at operation 212, which may be received via signaling in some embodiments. For example, the map creation server may determine the relative positions of a plurality of user terminals 10 in some embodiments. Additionally, the method may include signaling the relative position of the sensing location at operation 214 and signaling the other relative positions of the other sensing locations at operation 216. Accordingly, in one example embodiment, the map creation server 40 may determine one or more relative positions and signal the relative positions to the user terminals 10. Thereby, in some embodiments each user terminal 10 may receive information indicating the location of other user terminals around the user terminal. Also, in some embodiments the method may comprise determining an absolute position of the sensing location at operation 218. Thus, positional information may be provided for one or more devices.

In an example embodiment, an apparatus for performing the method of FIG. 9 and other methods described above may comprise a processor (for example, the processor 70) configured to perform some or each of the operations (200-218) described above. The processor may, for example, be configured to perform the operations (200-218) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 200-218 may comprise, for example, the processor 70, the user interface 72, the communication interface 74, the landmark selector 78, the sensory device 80, and/or the position determiner 82, as described above. However, the above-described portions of the apparatus 50 as they relate to the operations of the method illustrated in FIG. 9 are merely examples, and it should be understood that various other embodiments may be possible.

In some embodiments the operation 200 of receiving selection of a landmark may be conducted by means (e.g. means for selecting a landmark), such as the landmark selector 78, the user interface 72, and/or the processor 70. Further, the operation 202 of determining at least one position indicator relating to alignment with the landmark from a sensing location may be conducted by means (e.g. means for sensing), such as the sensory device 80, the user interface 72, and/or the processor 70. Additionally, the operation 204 of determining a relative position of the sensing location with respect to the landmark based at least in part on the position indicator and the operation 212 of determining one or more other relative positions of one or more other sensing locations may be conducted by means (e.g. means for determining a relative position), such as the position determiner 82, the communication interface 74, and/or the processor 70.

Also, the operation 206 of suggesting a landmark may be conducted by means, such as the landmark selector 78, the communication interface 74, the user interface 72, and/or the processor 70. Additionally, the operation 208 of providing for acknowledgement of alignment with the landmark may be conducted by means, such as the user interface 72, the sensory device 80, and/or the processor 70. Further, the operation 210 of signaling the position indicator may be conducted by means, such as the communication interface 74, the sensory device 70, and/or the processor 70. Also, the operation 214 of signaling the relative position of the sensing location, and the operation 216 of signaling the other relative positions of the other sensing locations may be conducted by means, such as the communication interface 74, the position determiner 82, and/or the processor 70. Additionally, the operation 218 of determining an absolute position of the sensing location may be conducted by means, such as the position determiner 82, and/or the processor 70.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the processor, cause the apparatus to:
receive selection of a landmark;
determine at least one position indicator relating to alignment with the landmark from a sensing location, wherein the at least one position indicator includes at least one of an altitude of the apparatus, an attitude of the apparatus when aligned with the landmark, or an orientation of the apparatus;

determine a relative position of the sensing location with respect to the landmark based at least in part on the position indicator;

receive one or more other position indicators relating to alignment with the landmark from one or more mobile terminals located at other sensing locations; and determine one or more other relative positions of the one or more mobile terminals located at the other sensing locations with respect to the landmark based at least in part on the one or more other position indicators.

2. The apparatus of claim 1, further configured to suggest the landmark.

3. The apparatus of claim 1, further configured to signal the position indicator; and signal the relative position of the sensing location.

4. The apparatus of claim 1, wherein the position indicator comprises one or more of an orientation when aligned with the landmark, an attitude when aligned with the landmark, and an altitude at the sensing location.

5. The apparatus of claim 1, further configured to determine an absolute position of the sensing location.

6. The apparatus of claim 1, further comprising user interface circuitry configured to:

facilitate user control of at least some functions of the apparatus through use of a display; and cause at least a portion of a user interface of the apparatus to be displayed on the display to facilitate user control of at least some functions of the apparatus.

7. A method, comprising:

receiving selection of a landmark;

determining at least one position indicator relating to alignment with the landmark from a sensing location, wherein the at least one position indicator includes at least one of an altitude of the apparatus, an attitude of the apparatus when aligned with the landmark, or an orientation of the apparatus;

determining a relative position of the sensing location with respect to the landmark via a processor based at least in part on the position indicator;

receiving one or more other position indicators relating to alignment with the landmark from one or more mobile terminals located at other sensing locations; and determining one or more other relative positions of the one or more mobile terminals located at the other sensing locations with respect to the landmark based at least in part on the one or more other position indicators.

8. The method of claim 7, further comprising suggesting the landmark.

9. The method of claim 7, further comprising signaling the position indicator; and signaling the relative position of the mobile terminal located at the sensing location.

10. The method of claim 7, wherein the position indicator comprises one or more of an orientation when aligned with the landmark, an attitude when aligned with the landmark, and an altitude at the sensing location.

11. The method of claim 7, further comprising determining an absolute position of the sensing location.

12. The method of claim 7, further comprising providing for acknowledgement of alignment with the landmark.

13. A computer program product comprising at least one non-transitory computer-readable storage medium having computer-executable program code portions stored therein, the computer-executable program code portions when executed by a processor causing an apparatus to perform:

receiving selection of a landmark;

determining at least one position indicator relating to alignment with the landmark from a sensing location, wherein the at least one position indicator includes at least one of an altitude of the apparatus, an attitude of the apparatus when aligned with the landmark, or an orientation of the apparatus;

determining a relative position of the sensing location with respect to the landmark based at least in part on the position indicator;

receiving one or more other position indicators relating to alignment with the landmark from one or more mobile terminals located at other sensing locations; and determining one or more other relative positions of the one or more mobile terminals located at the other sensing locations with respect to the landmark based at least in part on the one or more other position indicators.

14. The computer program product of claim 13, further comprising program code instructions for suggesting the landmark.

15. The computer program product of claim 13, further comprising program code instructions for:

signaling the position indicator; and signaling the relative position of the sensing location.

16. The computer program product of claim 13, wherein the position indicator comprises one or more of an orientation when aligned with the landmark, an attitude when aligned with the landmark, and an altitude at the sensing location.

17. The computer program product of claim 13, further comprising program code instructions for determining an absolute position of the sensing location.

18. The apparatus of claim 1, wherein the apparatus is further caused to create a map including the landmark, the sensing location, and the one or more other sensing locations.

19. The method of claim 7, further comprising:

creating a map including the landmark, the sensing location, and the one or more other sensing locations.

20. The computer program product of claim 13, further comprising computer-executable program code portions when executed by a processor, cause an apparatus to create a map including the landmark, the sensing location, and the one or more other sensing locations.

* * * * *